(12) United States Patent
Janke et al.

(10) Patent No.: US 7,529,999 B2
(45) Date of Patent: May 5, 2009

(54) INTEGRATED CIRCUIT ARRANGEMENT AND METHOD

(75) Inventors: Marcus Janke, Munich (DE); Dirk Rabe, Munich (DE); Steffen M. Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 350 days.

(21) Appl. No.: 11/530,262

(22) Filed: Sep. 8, 2006

(65) Prior Publication Data
US 2007/0079202 A1 Apr. 5, 2007

(30) Foreign Application Priority Data
Sep. 8, 2005 (DE) .................. 10 2005 042 790

(51) Int. Cl.
*G01R 31/28* (2006.01)
(52) U.S. Cl. ...................................... 714/734
(58) Field of Classification Search ............. 714/733, 714/734
See application file for complete search history.

(56) References Cited

U.S. PATENT DOCUMENTS

| 6,687,866 B2 * | 2/2004 | Fukuda ......................... 714/733 |
| 7,017,094 B2 * | 3/2006 | Correale et al. ............. 714/733 |
| 7,246,288 B2 * | 7/2007 | Casarsa ....................... 714/733 |

FOREIGN PATENT DOCUMENTS

| DE | 100 44 837 C1 | 9/2001 |
| DE | 102 23 176 B3 | 1/2004 |
| DE | 102 58 178 A1 | 7/2004 |
| DE | 103 26 089 B3 | 11/2004 |
| EP | 0 727 785 A1 | 8/1996 |
| EP | 1 182 702 A1 | 2/2002 |
| EP | 1 224 482 B1 | 5/2005 |
| WO | WO 02/43147 A1 | 5/2002 |

OTHER PUBLICATIONS

Janke et al., "Renaissance der physikalischen Angriffe", pp. 22-25 (2002) (w/statement of relevant portion) date Oct. 2002.

* cited by examiner

*Primary Examiner*—James C Kerveros
(74) *Attorney, Agent, or Firm*—Dickstein, Shapiro, LLP.

(57) ABSTRACT

An integrated circuit arrangement including at least one circuit part which is designed to run through a functional self test and to output test results of the functional self test, and a testing unit, which is coupled to an input and an output and which is coupled to the at least one circuit part via testing lines. The testing unit is designed to start the functional self test when a starting signal for the functional self test is applied to the input, to evaluate test results that are present to determine whether they have a predefined relationship with predefined values, and to output data indicating the test result at the output. The testing unit is also designed to start the functional self test by internal circuit means and to evaluate the test results present.

21 Claims, 3 Drawing Sheets

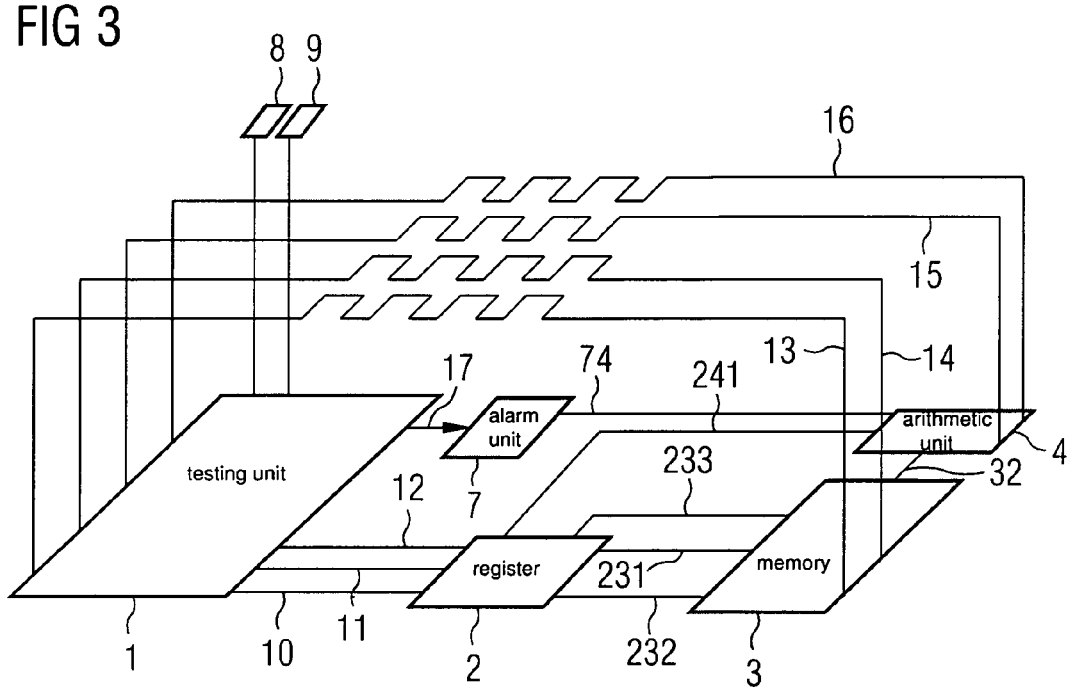

INTEGRATED CIRCUIT ARRANGEMENT AND METHOD

CROSS-REFERENCE TO RELATED APPLICATION

This application claims priority to German Patent Application Ser. No. 102005042790.1, which was filed on Sep. 8, 2005, and is incorporated herein by reference in its entirety.

FIELD OF THE INVENTION

The invention relates to an integrated circuit arrangement which is designed to run through a functional self-test.

BACKGROUND OF THE INVENTION

Chip cards for storing safety-relevant or monetary data have become very widespread. They can be used as access keys. Further areas of use are applications such as telephone cards, electronic travel cards or debit cards. The sensitive data can be changed, at least in the case of debit cards, for example when the credit on a telephone card decreases during telephoning. The storage and processing of the sensitive data is made possible by a chip module inserted into the chip card and having an integrated circuit arrangement, which is normally formed as a chip.

The production of such a chip is a highly technological process, in which it is not possible to rule out some chips not functioning after production. Therefore, the chips are usually tested after production, it being necessary to draw a balance between the most comprehensive test and the expenditure of time associated therewith.

One possible configuration of such a functional test is what is known as a "built-in self test" (BIST).

During a subsequent use of the chip in the chip card, it is not possible for attacks to be ruled out. The attacks on the sensitive data of the chip are carried out, for example, by means of "probing" or "forcing". In the case of probing, the data transmitted within the chip module is tapped off by means of fine needles and evaluated. In the case of forcing, an access to the data is made in a similar way. In this case, by supplying external data, an attempt is made to manipulate the data processing of the chip, in order for example to gain information about its functioning, its security mechanisms or its sensitive data.

Such physical attacks are carried out, for example, with what is known as an FIB device (short for "focused ion beam"). By means of these devices, the integrated circuits on the chip module can be deliberately manipulated. By means of the vapor deposition of gases over a closely limited range, covering or protective layers of the integrated circuit can specifically be etched away. Furthermore, these devices also permit isolators to be inserted into conductor tracks of the circuit to be examined or the application of additional lines. As a result, rewiring of the circuit to be examined is carried out on a microscopic scale.

Measures against such attacks comprise, for example, what are known as dummy lines, which are provided in addition to the actual circuit arrangement. These are lines without any function within the actual circuit, which are arranged in the initially free regions of the circuit arrangement. Dummy lines are intended to confuse the attacker about the actual structure of the circuit and to deceive him about the circuit functionality. By means of suitable tools for circuit analysis, dummy lines can be detected with little effort and, if they are passive lines, that is to say non-signal-carrying lines, they can easily be circumvented or severed.

In a further development, the dummy lines have a constant voltage applied to them, so that at least the severing of these dummy lines is detected. This protective mechanism can also be circumvented with little effort if the lines are rewired without influencing the applied voltage, in order to gain access to the lines of the circuit planes arranged under them.

A further safeguard against physical attacks is what is known as an "active shield" or active protective shield. This is a large number of lines, for example running in parallel, which are arranged in an uppermost circuit plane similar to a fine covering grid. These lines have random sequences of numbers applied to them, which are detected by a suitable circuit unit with regard to possible changes in the random sequences. A change permits a conclusion to be drawn about an attack. The disadvantage of such an active protective shield is the associated considerable expenditure on circuitry, in particular for the random number generator and the detecting circuit unit.

SUMMARY OF THE INVENTION

An integrated circuit arrangement comprises an input, an output, and at least one circuit part which is designed to run through a functional self test and to provide test results of a functional self test. The circuit arrangement further comprises a testing unit, which is coupled to the input and output, and which is coupled to the at least one circuit part via testing lines. The testing unit is designed to start the functional self test when a starting signal is present on the input, and to output the test results at the output and/or to evaluate the test results to determine whether the test results have a predefined relationship with predefined values, and to output data indicating the test result at the output. The testing unit is also designed to detect an attack by starting the functional self test by internal circuit means, evaluating the test results provided to determine whether the test results have a predetermined relationship with the predefined values.

This circuit arrangement provides an effective and simpler safeguard against physical attacks on integrated circuit arrangements, in that the testing unit is constructed to start the functional self test to be started externally by internal circuit means as well and to evaluate the test results present.

The advantage of this arrangement is that additional expenditure on circuitry for the detection of physical attacks and the associated costs are avoided by means of the multiple use of the testing unit, in that the functional self test is no longer carried out once for the detection of production defects but also during the subsequent operation of the circuit arrangement, in order to draw conclusions about physical manipulation attempts from a faulty test run.

A method of protecting a circuit arrangement from attacks, including a first and a second operating mode. The first operating mode comprises:

applying a starting signal to an input of the circuit arrangement in order to start a functional self test, carrying out the functional self test of at least one circuit part of the integrated circuit arrangement, transmitting test results of the functional self test to a testing unit, evaluating the test results to determine whether they have a predetermined relationship with the predefined values, and outputting the test results and/or outputting data indicating the test result;

The second operating mode comprises:
starting the functional self test by internal circuit means,
carrying out the functional self test of at least one circuit part of the integrated circuit arrangement,
transmitting test results of the functional self test to a testing unit, and
evaluating the test results to determine whether they have a predetermined relationship with the predefined values.

The advantage of this method is that the functional self test implemented is used not only for the detection of production defects but also of attacks, so that the protection against attack entails little additional expenditure.

BRIEF DESCRIPTION OF THE DRAWINGS

In the following text, the invention will be explained by using exemplary embodiments and with reference to the drawing, in which:

FIG. 3 shows a third exemplary embodiment of the integrated circuit arrangement.

DETAILED DESCRIPTION OF THE INVENTION

Figure 1:
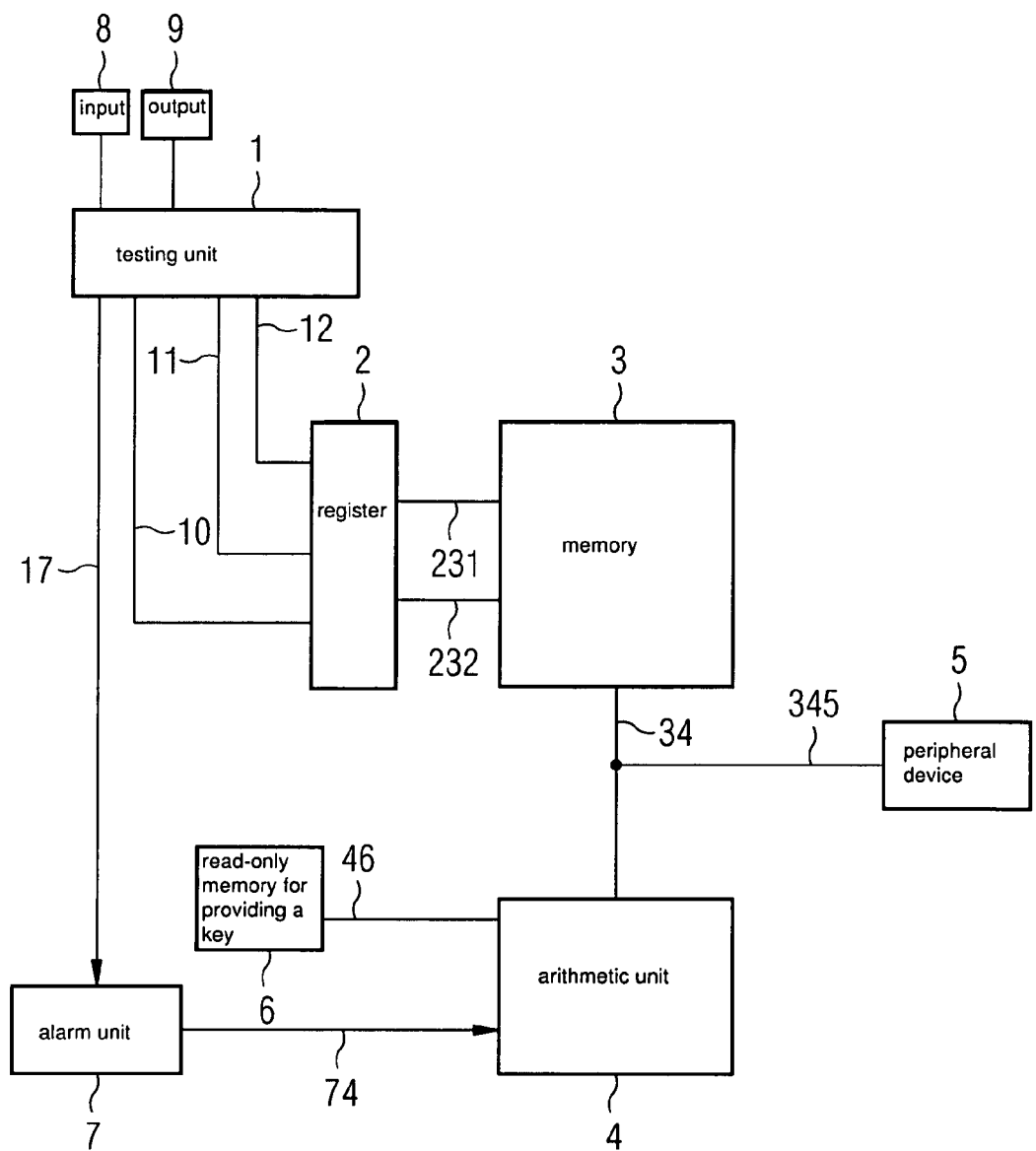
FIG. 1 shows a first exemplary embodiment of the integrated circuit arrangement.

The testing unit of the integrated circuit arrangement is advantageously coupled to an alarm unit in such a way that, in the case of a functional self test started by internal circuit means, the alarm unit triggers an alarm reaction of the circuit arrangement if the test results present on the testing unit do not have the predetermined relationship with the predefined values. As a result, manipulation attempts that are detected can be countered by suitable defense measures.

Each time the circuit arrangement is switched on, the circuit arrangement is advantageously checked for physical attacks by means of a test run started by internal circuit means. Switching on is to be understood to mean the application of a voltage supply and/or a starting signal to the circuit arrangement. Since this functional or self test is normally designed in such a way that the largest possible part or virtually the entirety of the circuit arrangement is checked with little expenditure on time, the additional time required when starting up the circuit arrangement is kept within limits, in particular in view of the protection that can be achieved as a result.

The testing lines are advantageously arranged in an upper circuit plane of the circuit arrangement, which comprises a plurality of circuit planes, in order to make access to circuit parts arranged under them more difficult. As a result, even spying out the circuit function visually is made considerably more difficult.

As a result of the application to the testing lines of the test signals which are transmitted between the testing unit and the circuit part to be tested, said testing lines fulfill the function of an active protective shield. Furthermore, the identification of the testing lines acting as an active protective shield is made more difficult, since it is not possible to see that they are used not only to test the circuit arrangement following production but thereafter during the circuit operation for the active detection of physical attacks.

The testing lines are advantageously arranged in such a way that they extend over the largest possible region of the circuit arrangement and thus make access to circuit planes lying under them more difficult. The testing lines do not necessarily have to be arranged only in the uppermost circuit plane but they can additionally or alternatively be arranged in deeper circuit planes, for example directly above a circuit part to be protected in particular. The protection can also extend only over individual regions of the circuit arrangement which are classified as particularly sensitive, such as regions for the administration of a cryptographic key. The testing lines can be arranged in the form of a meander or in parallel over the regions requiring protection or the entire circuit arrangement, in order to cover as well as possible potential points of attack on the circuit parts arranged underneath them.

In an advantageous development, storage elements, for example flip-flops, are coupled into the testing lines, and are coupled to the circuit part to be tested in such a way that, during and/or after the performance of the functional self test, results of the test run that can be evaluated in the storage elements are provided. The circuit part to be tested can also be coupled to the testing lines via a register. In this case, the communication between the testing unit and the circuit part to be tested is provided via the register, in which starting values are provided by the testing unit and the results are provided by the circuit part to be tested. The transmission of the starting values and results to and from the register is carried out via the testing lines.

In an advantageous development of the integrated circuit arrangement, the functional self test is started automatically when the circuit is switched on. As a result, in particular forcing attacks can be detected more easily.

With regard to the method, an alarm reaction of the circuit arrangement is advantageously carried out in the second operating mode if the test results do not have the predetermined relationship with the predefined values, in order to counter attacks actively.

The testing unit advantageously provides starting values for the functional self test which can be varied, in order to increase the security.

By means of a functional test which tests the largest possible part of the circuit arrangement, virtually comprehensive protection against physical attacks can be achieved, which extends over virtually all of the circuit arrangement.

FIG. 1 shows a block diagram of a first exemplary embodiment of the circuit arrangement, comprising a plurality of circuit parts 3, 4, 5, 6. The circuit parts 3, 4, 5, 6 can be formed, for example, as a memory 3, as an arithmetic unit 4, as a peripheral device 5, and as a read only memory for providing a key 6.

The circuit arrangement also comprises a testing unit 1 and a register 2, which is connected upstream of the memory 3 via connections 231, 232. The testing unit 1 is coupled to an input 8 and an input 9. The input 8 and 9 can be formed as an input or output provided only for the production test. It is also conceivable that contact areas provided as such an input or output of this type are used for communication with the card during normal operation. Furthermore, the testing unit 1 is coupled via testing lines 10, 11, 12 to the register 2. Also provided is an alarm unit 7, which is coupled between the testing unit 1 and the arithmetic unit 4. The alarm unit 9 is designed to make access to the arithmetic unit 4 and to initiate an alarm function. The alarm reaction can comprise the output of an alarm signal, to which various circuit parts are coupled in such a way that, when the alarm signal is output, a suitable alarm reaction of the circuit arrangement proceeds.

The circuit arrangement is designed to perform a functional self test. Within the context of such a test, a starting signal for starting the test and, usually, test signals for initializing circuit parts are supplied to a circuit input. The output signals generated by the tested circuit parts are compared with expected results from a circuit arrangement functioning without faults. A difference permits conclusions to be drawn about a fault in the circuit arrangement. The result of the test signal evaluation or the evaluated or conditioned test signals is provided at an output of the circuit arrangement. By using the data output, it is possible to draw conclusions about the serviceability of the circuit arrangement. Damaged circuit arrangements are separated out or possibly repaired.

One possible configurations of such a functional test is what is known as a "built-in self test" (BIST). The circuit arrangement to be tested comprises additional testing logic, the BIST controller as it is known, in order for example to test a memory of the circuit arrangement. Following the starting of the test by means of a starting signal, multiple writing and reading of one or more data words into and from the memory and a comparison of the data word read with that previously written are carried out. If the comparison shows a difference, the memory or the testing logic is defective. The results can be conditioned by the BIST controller in such a way that an individual status bit is output, which merely indicates whether the test has run successfully or unsuccessfully. Of course, it is also conceivable to test further circuit parts or the circuit as such with the built-in self test.

In the case of a functional self test which is carried out at the manufacturer in order to detect possible damage or defects in the circuit arrangement, a starting signal is applied to the input 8. Starting values for the initialization of the circuit arrangement to be tested can likewise be supplied via this input or further inputs provided for the purpose. On the basis of these starting values, the functional self test of the circuit part 3 formed as a memory is carried out.

During the performance of the functional self test, for example, the starting values from the register 2 are written at various points in the memory 3, read out again and, after being read, compared with the starting values. Further testing possibilities comprise the interactions between a plurality of circuit parts, for example of the memory 3 in combination with the arithmetic unit 4 or the peripheral device 5, in order in this way to test the circuit arrangement to the greatest possible extent.

It is also conceivable for the testing unit 1 to be coupled via the testing lines to a plurality of the circuit parts 3, 4, 5, 6.

The results of the functional self test are written into the register 2 and, from there, are transmitted via the testing lines 10, 11, 12 to the testing unit 1. The testing unit 1 makes a comparison to determine whether the values present agree with predefined values which correspond to a fault-free test run based on the starting value notified. If this is so, it can be assumed that the circuit arrangement is not damaged. The testing unit 1 outputs data indicating the test result via an output 9 of the circuit arrangement. The result can be output in the form of a single bit which merely indicates whether the test has run without error. Alternatively, it is also conceivable for the test results to be coupled to the output 9 and to be output unchanged or in a form conditioned by the testing unit. By using the test results or the conditioned test results, for example an external evaluation device can draw conclusions about the defects in the circuit arrangement from the type of errors during the test run. Depending on the defects or damage detected in the circuit arrangement, the latter can be separated out or repaired.

For the detection of attacks, the functional test is started internally, that is to say without the starting signal being present on the input. The functional self test is performed when the circuit arrangement is switched on, switching on also being understood to mean that the circuit arrangement is supplied with energy in such a way that the circuit arrangement is ready to operate. In order to start the functional self test, starting values are loaded into the register 2 by the testing unit 1 via the testing lines 10, 11, 12. These starting values can always be the same, they can be random values or they can be taken from a value table or a state machine. The actual functional self test is performed as already described above.

The results of the functional self test are written into the register 2 and, from there, are transmitted to the testing unit 1 via the testing lines 10, 11, 12. The testing unit 1 makes a comparison to determine whether the values present agree with predefined values, which correspond to a fault-free test run on the basis of the starting value notified. If this is so, it is to be assumed that the test has run without errors and the function of the circuit parts tested or of the entire circuit arrangement is functioning without faults without any reference to manipulative interventions. If the results of the functional self test differ from the predefined results, then it is to be concluded that there is a defect in the circuit arrangement or that there has been an attack. Since the defects of the circuit arrangement should already have been detected by the functional self test of the manufacturer, in this case it is rather to be assumed that an attack has been carried out. The attack can be made on the circuit part to be tested itself or a circuit part interacting therewith, and lead to the functional self test no longer running without error. However, the attack can also be made on the testing lines or the lines between the register 2 and the circuit part 3 to be tested, and lead to the starting values or results of the self test being changed, so that the testing unit detects a difference between the result supplied to it and the predefined result, which is to be interpreted as a faulty test run on the basis of an attack.

The testing unit 1 detects this error and is coupled to the alarm unit 7 in such a way that an intervention is consequently made in the functional sequence of the circuit arrangement. This is illustrated in FIG. 1 by way of example by the connection 74 between the alarm unit 7 and the arithmetic unit 4.

It should be noted that the results of the functional self test started by internal circuitry are advantageously not output at the output 9, in order not to supply the attacker with any conclusions about the type of attack detection.

The alarm reaction can comprise many and various measures. For example, the circuit can be shut down. A new start, what is known as a "reset", can be carried out, or circuit parts can specifically be switched off. The latter procedure is recommended when the testing unit is suitable to draw conclusions about the manipulated testing line and the circuit part attacked, by using the error. A further countermeasure is what is known as a "sense reset", in which the entire circuit is blocked and the functional sequence of all the circuit parts is stopped. These defense measures have the purpose that the functionality of the circuit arrangement is at least highly restricted because of the suspected attack, so that the attacker, although he has access to signal-carrying lines, cannot obtain further information from the functional sequence of the circuit arrangement.

Figure 2:
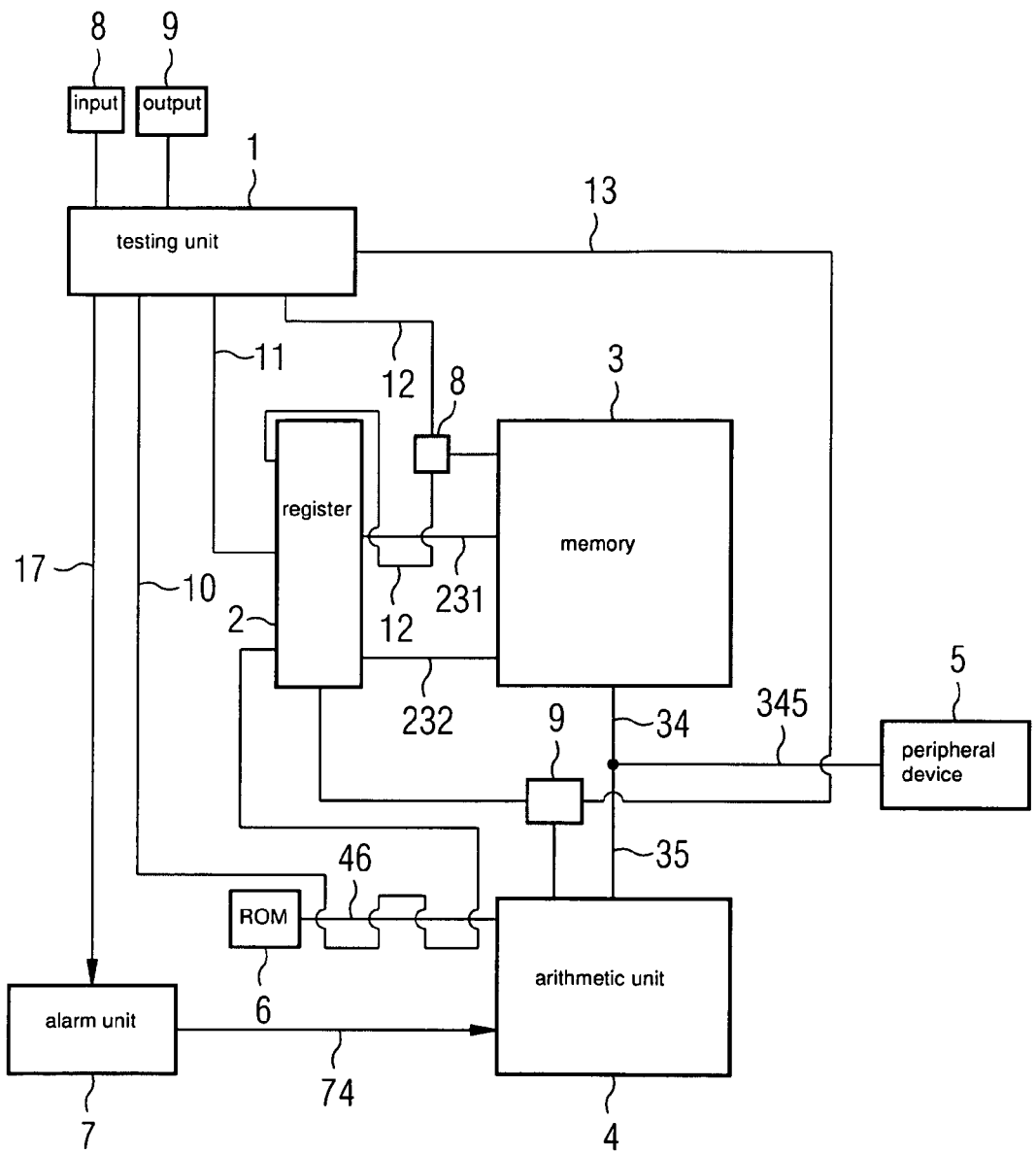
FIG. 2 shows a second exemplary embodiment of the integrated circuit arrangement.

FIG. 2 shows the block diagram of a second exemplary embodiment of the integrated circuit arrangement. In the following text, the differences from the first exemplary embodiment will primarily be discussed. In order to avoid repetitions, no repeated description of coincident arrangements will be made.

The arrangement in FIG. 2 also comprises the circuit parts 3, 4, 5, 6, which can be formed in the same way as in the exemplary embodiment in FIG. 1. In this exemplary embodiment, too, the testing unit 1 is coupled to the input 8, the output 9 and to a register 2 via testing lines 10, 11, 12. As opposed to the previous exemplary embodiment, the testing lines 10, 11 and 12 are not arranged directly between the testing units 1 and the register 2. Instead, they are arranged in such a way that they run via the connecting lines 231, 345, 34, 46 between the various circuit parts 3, 4, 5, 6. Furthermore, additional testing lines 13 are provided, in order as a result to be able to protect a larger region of the circuit arrangement.

The testing lines 10, 11, 12, 13 extend over the largest possible region of the integrated circuit arrangement, in order to ensure the most comprehensive access protection possible. Particularly sensitive circuit parts, such as the circuit part 6 in which a key is stored and is fed to the arithmetic unit 4 via the connection 46, can be protected by testing lines arranged above them and running closely adjacently or by regions of one of the testing lines arranged above them and running closely adjacently. In this case, the connecting line 10 for protecting the connection 46 is arranged above the latter in the form of a meander. The testing lines 10, 11, 12, 13 can of course also be arranged above the circuit parts 3, 4, 5, 6 and be formed as a meander or running in parallel at a close distance.

Furthermore, the circuit arrangement 2 comprises memory elements 8, 9, which can be formed as flip-flops, for example. These memory elements 8, 9 are coupled to the testing lines 12, 13, so that, during the test run, these interact with the circuit parts to be tested and/or store intermediate results of the functional self test.

The testing lines or some of the latter are advantageously formed in the uppermost circuit plane, in order in the event of a physical attack, as an active protective shield, to protect the lines or circuit parts lying underneath them. Of course, it is also conceivable that particularly sensitive parts beyond these or alternatively in layers lying underneath them are protected.

FIG. 3 shows a third exemplary embodiment of the integrated circuit arrangement schematically in a perspective illustration. For reasons of clarity, a simply constructed circuit arrangement having only two circuit planes is illustrated. Of course, substantially more complicated circuit arrangements having a large number of circuit planes are also conceivable.

The circuit parts 3, 4, just like the register 2 and the testing unit 1, are arranged in a lower plane. The register is coupled to the circuit parts 3, 4 via the lines 231, 232, 233 and 241. The testing unit is coupled to the register via lines 10, 11, 12 running in this plane. The initiation of the alarm reaction is possible via the alarm unit 7 coupled to the testing unit 1. The testing unit 1 is coupled to the input 8 and the output 9, which, by way of example, are arranged in the uppermost circuit plane.

Furthermore, in a plane arranged above, the circuit arrangement comprises testing lines 13, 14, 15, 16, by means of which the testing unit 1 is coupled to the circuit parts 3 and 4. These testing lines 13, 14, 15, 16 are arranged in parallel or in the form of meanders in some regions and extend over the entire two-dimensional extent of the circuit arrangement, in order to protect the circuit parts lying underneath them against physical attacks. The access to the lower circuit plane is not possible without rewiring or removing the upper circuit layer. Those procedures will be associated with an erroneous test run.

The design of such a protected circuit arrangement can be optimized to the effect that, by means of a specific programming tool for the design of the actual circuit arrangement, additional testing lines are added, which specifically protect regions identified as particularly sensitive by the user and/or are arranged in an upper circuit layer.

The arrangement and the design of the testing lines can be carried out by the programming tool in such a way that, for example, the protective shield character is achieved by means of testing lines which extend in the uppermost line layer covering an area over the widest possible region of the circuit arrangement, in that these testing lines are arranged over the actual circuit in a manner similar to a covering grid. Furthermore, the individual testing lines should not be configured to be too wide, since in this case parts of the corresponding lines could be removed in order to make access to the deeper line layers without severing the line, which would make the detection of such an attack at least more difficult. Furthermore, wide testing lines also permit conclusions to be drawn as to the protective function in the event of a visual inspection. Alternatively or additionally, it is also conceivable for the structure and method of arrangement of the testing lines to be similar to the other lines of the circuit arrangement, so that the actual structure of the circuit arrangement cannot be detected directly.

It should be noted that the exemplary embodiments illustrated in FIGS. 1, 2 and 3 can be combined with one another.

What is claimed is:

1. An integrated circuit arrangement comprising:
   an input;
   an output;
   at least one circuit part configured to perform a functional self test and to provide test results of the functional self test; and
   a testing unit coupled to the input and output, and coupled to the at least one circuit part via testing lines, which are arranged in a circuit plane above at least one of the at least one circuit part and a further circuit part,
   wherein the testing unit is configured to start the functional self test when a starting signal is applied to the input, to output the test results at the output, or to evaluate the test results to determine whether the test results have a predefined relationship with predefined values, and to output data indicating the test results at the output, and
   wherein the circuit arrangement is also configured to internally start the functional self test in order to detect an attack, and the testing unit is configured to evaluate the test results to determine whether the test results have a predefined relationship with predefined values.

2. The integrated circuit arrangement as claimed in claim 1, further comprising an alarm unit coupled to the testing unit and configured to trigger an alarm if the test results do not have the predetermined relationship with the predefined values.

3. The integrated circuit arrangement as claimed in claim 1, wherein the testing lines are arranged in an uppermost circuit plane of the circuit arrangement.

4. The integrated circuit arrangement as claimed in claim 1, wherein the testing lines are arranged within the largest possible region of a region comprising the circuit arrangement.

5. The integrated circuit arrangement as claimed in claim 1, wherein the testing lines are arranged adjacent to one another or in a form of a meander.

6. The integrated circuit arrangement as claimed in claim 1, wherein the circuit part is coupled to the testing lines via a storage element.

7. The integrated circuit arrangement as claimed in claim 6, wherein the storage element is coupled to the testing lines such that the testing unit can write starting values of the functional self test into the storage element.

8. The integrated circuit arrangement as claimed in claim 6, wherein the storage element is coupled to the testing lines such that the test results of the functional self test of the at least one circuit part can be written into the storage element.

9. The integrated circuit arrangement as claimed in claim 1, wherein the functional self test of the circuit arrangement starts when a voltage supply or a starting signal is applied at the input.

10. An integrated circuit arrangement comprising:
an input;
an output;
at least one circuit part configured to perform a functional self test and to provide test results of the functional self test;
testing lines, which are arranged above at least one of the at least one circuit part and a further circuit part;
a testing unit coupled to the input and output, and coupled to the at least one circuit part via testing lines,
wherein the testing unit is configured to start the functional self test when a starting signal is present on the input, as a reaction to the starting signal, and to output the test results at the output, or to evaluate the test results to determine whether the test results have a predefined relationship with predefined values, and to output data indicating the test results at the output, and
wherein the circuit arrangement is also configured to internally start the functional self test in order to detect an attack, and the testing unit is configured to evaluate the test results to determine whether the test results have a predefined relationship with predefined values; and
an alarm unit coupled to the testing unit and configured to trigger an alarm if the test results provided do not have the predetermined relationship with the predefined values.

11. The integrated circuit arrangement as claimed in claim 10, wherein the testing lines are arranged in an uppermost circuit plane of the circuit arrangement.

12. The integrated circuit arrangement as claimed in claim 10, wherein the testing lines are arranged adjacent to one another or in a form of a meander.

13. The integrated circuit arrangement as claimed in claim 10, wherein the circuit part is coupled to the testing lines via a storage element.

14. The integrated circuit arrangement as claimed in claim 13, wherein the storage element is coupled to the testing lines such that the testing unit can write starting values of the functional self test into the storage element, and the test results of the functional self test of the at least one circuit part can be written into the storage element.

15. The integrated circuit arrangement as claimed in claim 10, wherein the functional self test of the circuit arrangement starts when a voltage supply or a starting signal is applied at the input.

16. A method of protecting an integrated circuit arrangement from attacks, comprising a first operating mode and a second operating mode,
wherein the first operating mode comprises:
applying a starting signal to an input of the circuit arrangement in order to start a functional self test;
carrying out the functional self test of at least one circuit part of the integrated circuit arrangement;
providing testing lines, which are arranged in a circuit plane above at least one of the at least one circuit part and a further circuit part;
transmitting test results of the functional self test to a testing unit via the testing lines;
evaluating the test results to determine whether they have a predetermined relationship with predefined values; and
outputting the test results or outputting data indicating the test result; and
wherein the second operating mode comprises:
starting the functional self test by internal circuitry;
performing the functional self test of at least one circuit part of the integrated circuit arrangement;
transmitting test results of the functional self test to a testing unit; and
evaluating the test results to determine whether they have a predetermined relationship with the predefined values.

17. The method as claimed in claim 16, further comprising executing an alarm in the second operating mode if the test results do not have the predetermined relationship with the predefined values.

18. The method as claimed in claim 16, further comprising starting the functional self test in the second operating mode when a voltage supply or a starting signal is applied to the circuit arrangement.

19. The method as claimed in claim 16, further comprising transmitting starting values for the functional self test, on which the results of the functional self test depend, from the testing unit to the circuit part.

20. The method as claimed in claim 16, wherein the alarm depends on the extent to which the predetermined relationship between the test results and the predefined values is not satisfied.

21. The method as claimed in claim 16, wherein the functional self test tests the largest possible part of the integrated circuit arrangement.

* * * * *